United States Patent [19]
Lang

[11] 3,957,274
[45] May 18, 1976

[54] SEALING ARRANGEMENT FOR A MACHINE WITH A COVER INSULATED AGAINST STRUCTURE-BORNE SOUND

[75] Inventor: Karl Lang, Berlin, Germany

[73] Assignee: Siemens Aktiengesellschaft, Munich, Germany

[22] Filed: June 12, 1975

[21] Appl. No.: 586,162

[30] Foreign Application Priority Data
June 14, 1974 Germany.............................. 2428905

[52] U.S. Cl..................................... 277/4; 277/53; 277/59; 308/36.1
[51] Int. Cl.² ...................... F16J 15/16; F16J 15/44
[58] Field of Search ................. 277/3, 4, 59, 17, 18, 277/29, 15, 53, 32; 308/36.1, 237 R, 237 A; 310/51, 90

[56] References Cited
UNITED STATES PATENTS

| | | | |
|---|---|---|---|
| 1,068,148 | 7/1913 | Lyon et al................................ | 277/4 |
| 2,673,103 | 3/1954 | Tremolada............................ | 277/32 |
| 2,828,616 | 4/1958 | Zeigler et al.......................... | 310/51 |
| 2,979,351 | 4/1961 | Wilkins................................... | 277/4 |
| 3,030,118 | 4/1962 | Groce..................................... | 277/4 |
| 3,459,978 | 8/1969 | Trucks et al........................... | 310/51 |
| 3,622,821 | 11/1971 | Maffey.................................. | 310/90 |
| 3,624,434 | 11/1971 | Dafler.................................... | 310/90 |

Primary Examiner—Robert I. Smith
Attorney, Agent, or Firm—Kenyon & Kenyon Reilly Carr & Chapin

[57] ABSTRACT

The invention is directed to a sealing arrangement for a machine with a cover having a shaft lead-through for accommodating the shaft, the cover being installed so as to be insulated against structure-borne sound. The machine is equipped with a bearing located outside of the cover and bearing has an end-face facing the cover. The sealing arrangement provides a seal between the bearing and cover and includes two seals which are mounted at the bearing end-face facing the cover so as to be in sealing contact with the shaft. The seals are spaced from each other and located on a ring-shaped part. An annular member is arranged on this ring-shaped part so as to be axially movable and has a flange whose end-face covers the shaft lead-through of the cover and rests in an elastic seal-tight manner against the end-face of the cover.

4 Claims, 1 Drawing Figure

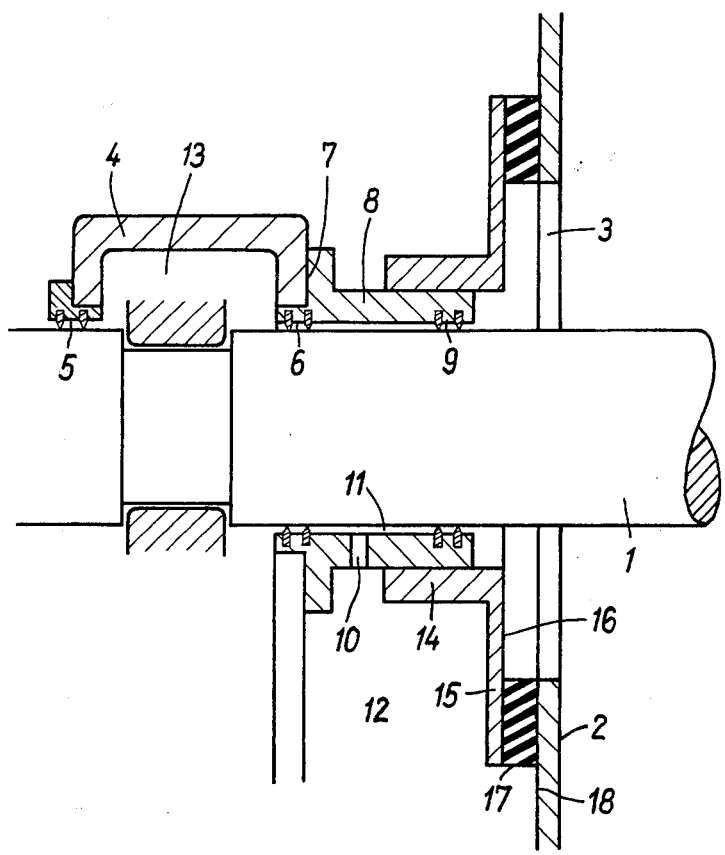

SEALING ARRANGEMENT FOR A MACHINE WITH A COVER INSULATED AGAINST STRUCTURE-BORNE SOUND

BACKGROUND OF THE INVENTION

To muffle the operating sound, it is known to cover machines completely against the ambient air space by means of a sound-suppressing cover. However, such a cover cannot always be configured so as to cover the entire machine set, because in most cases there is the necessity to lead the machine shaft to the outside so that an opening for the shaft lead-through must be provided in the cover. The gap then appearing between the shaft and the shaft lead-through in the cover must be relatively large because the spring-mounting of the cover, insulated against structure-borne noise, will cause relative motions between the shaft and the cover to occur, which may also include unavoidable resonant vibrations. But gap-like openings largely nullify the sound-reducing effect of the cover.

Therefore, the German Pat. No. 1,181,010 describes an arrangement in which the cover, installed so as to be insulated against structure-borne sound, is assembled to the bearing housing at the point where the shaft passes therethrough with an elastic seal which makes contact all around and insulates against structure-borne sound. Thus, the bearing housing itself forms a part of the cover which includes the shaft lead-through, and is taken out of the structure-borne sound insulation. In this known arrangement, the external form of the bearing housing is made as smooth as possible so that the cutout required to assemble the cover will be of the simplest possible shape, nor must there be inside the bearing housing a path for the sound to run parallel to the shaft. Accordingly, the known arrangement requires a specific constructional adaptation of the bearing and the bearing housing even when it is applied as a shaft lead-through, which shaft lead-through is not insulated against structure-borne sound, of a cover installed so as to be insulated against structure-borne sound. Moreover, there is the danger that because of the presence of lubricating oil in the bearing, oil drops or oil mist will enter the interior of the cover wherein an underpressure usually prevails causing undesirable contamination there.

Accordingly, it is an object of the invention to provide a sealing arrangement for a machine equipped with a cover and a bearing outside of the cover, the cover having a shaft lead-through and being installed so as to be insulated against structure-borne sound. More specifically, it is an object of the invention to provide such a sealing arrangement between the cover and bearing which is easily produced and which prevents the emission of sound from the interior of the cover and which prevents oil or oil mist being drawn from the bearing.

SUMMARY OF THE INVENTION

The above objects are achieved with the sealing arrangement according to the invention for a machine equipped with a shaft defining a shaft axis and with a cover having an end-face with a shaft lead-through, the cover being installed so as to be insulated against structure-borne sound. The machine is further equipped with a bearing located outside of the cover and the bearing has an end-face facing toward the end-face of the cover.

The sealing arrangement includes two seals spaced one from the other to define a space therebetween. Mounting means in the form of a carrying body is utilized for mounting the seals at the above-mentioned end-face of the bearing so as to be in sealing contact with the shaft. A bore connects the space between the seals to the ambient. An annular member is mounted on the mounting means so as to be displaceable in the direction of the shaft axis, the annual member having a flange defining an end-face facing the cover. The end-face of the flange covers the shaft lead-through and engages the end-face of the cover in an elastic seal-tight manner.

Therefore, the connection between the cover and the bearing is configured so as to be completely gap-free and yet it permits at the same time larger tolerances in the spacing between the cover and the bearing. The sealing arrangement is thus readily adaptable. In addition, because of the provision of a double shaft seal on the bearing side facing the cover, and because of the communication of the space between the seals with the outside air, direct communication between the interior of the cover, in which underpressure prevails, and the interior of the bearing is avoided so that no oil or oil mist can penetrate into the interior of the cover from the bearing. The bore provided for this purpose, as the only aperture to the outside, has a considerably smaller cross-sectional area in comparison with the otherwise present gap around the shaft so that it does not impair the sound suppression. It is recommended to meet the condition that the cross-sectional area of the bore be smaller than $(x \cdot 10^{-4})$ where $x$ is the number of square meters of cover area.

Although the invention is illustrated and described herein as a sealing arrangement for a machine with a cover insulated against structure-borne sound, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWING

The drawing is a schematic diagram showing a longitudinal section of the bearing and the sealing arrangement according to the invention provided between the bearing and a cover installed so as to be insulated against structure-borne sound.

DESCRIPTION OF THE PREFERRED EMBODIMENTS OF THE INVENTION

An electric machine (not shown) is connected to a driven machine (not shown) by a shaft 1. So that a certain noise level will not be exceeded during the operation of the electric machine, the latter is covered by a cover 2 installed so as to be insulated against structure-borne sound. This cover 2 contains an opening to serve as the shaft lead-through 3. The opening surrounds the shaft 1 with a large gap so that the relative motions between the cover and the shaft, necessitated by the structure-borne sound insulation, and also possible resonant vibrations, will not be hindered, this being so also in the event of larger dimensional variations due to tolerances.

The bearing 4 of the shaft 1 is located outside of the cover 2 which is installed so as to be insulated against structure-borne sound. This bearing 4 is oil-lubricated in the conventional manner and sealed on both end-faces against the shaft 1 by means of seals 5 and 6, respectively. The seal 6, located on the end-face area 7 of the bearing 4 facing the cover 2, lies in mounting means in the form of a ring-shaped part 8 which serves as the supporting part and is fastened to the face area 7 of the bearing 4. This ring-shaped part 8 supports another seal 9 spaced apart from the seal 6. All seals 5, 6 and 9 are of identical construction such as labyrinth seals. Provided at the lowest point of the ring-shaped part 8 is bore means in the form of a bore 10 which connects the chamber 11 located between the seals 6 and 9 to the outer space 12. In this manner, there is no direct connection between the oil mist-filled interior 13 of the bearing 4 and the interior of the cover 2, the cover 2 being installed so as to be insulated against structure-borne sound and its interior being at underpressure. A suction of oil mist to the interior of the cover 2 is thus safely prevented because the air which may be sucked by the machine into the interior of the cover 2 is drawn from the chamber 11 to the outer space 12 through the bore 10 and not through the extremely narrow gap between the seal 6 and the shaft 1.

Disposed on the ring-shaped part 8, so as to be movable in the axial direction, is another ring-shaped part 14 with a flange 15 whose face area 16 covers the shaft lead-through 3 of the cover 2. Mounted to the face area 16 at the edge of the flange 15 is a sealing ring 17 of rubber-elastic material which presses against the face area 18 of the cover 2. The dimensions of the sealing ring 17 are advantageously selected so that the sound suppression of the sealing ring 17 is just as great as that of the wall of the cover 2 whose mass is much greater than that of the sealing ring 17. In this manner, the seal between the bearing 4 and the cover 2 is configured so as to be completely without gap, and the elastic sealing material in contact with the cover 2 does not impair the sound suppression either. Because of the fact that the ring-shaped part 14 is movable in the axial direction on the ring-shaped part 8, tolerances in the spacing between the cover 2 and the bearing 4 can be compensated in the simplest manner.

To facilitate the assembly it is advisable to make the ring-shaped parts 8, 14 of two pieces.

What is claimed is:

1. In a machine such as an electrical machine or the like equipped with a shaft defining a shaft axis and with a cover having an end-face with a shaft lead-through accommodating the shaft, the cover being installed so as to be insulated against structure-borne sound, the machine further being equipped with a bearing located outside of the cover, the bearing having an end-face facing toward the end-face of the cover, a sealing arrangement comprising: two seals spaced one from the other to define a space therebetween; mounting means for mounting said seals at said end-face of the bearing so as to be in sealing contact with the shaft; bore means for connectng said space to the ambient; and, an annular member mounted on said mounting means so as to be displaceable in the direction of the shaft axis, said annular member having a flange defining an end-face facing the cover, said end-face covering the shaft lead-through and engaging said end-face of the cover in an elastic seal-tight manner.

2. The sealing arrangement of claim 1, said mounting means being an annular body securely mounted to the bearing.

3. The sealing arrangement of claim 2, said bore means being a bore formed in said annular body and located at the lowest location thereof.

4. The sealing arrangement of claim 2, said annular member and said annular body each being made of two parts.

* * * * *